(12) United States Patent
Shiban (10) Patent No.: US 7,601,307 B2
(45) Date of Patent: Oct. 13, 2009

(54) HAZARDOUS GAS ABATEMENT SYSTEM USING ELECTRICAL HEATER AND WATER SCRUBBER

(75) Inventor: Samir S. Shiban, Chandler, AZ (US)

(73) Assignee: Innovative Engineering Solutions, Inc., Chandler, AZ (US)

( * ) Notice: Subject to any disclaimer, the term of this patent is extended or adjusted under 35 U.S.C. 154(b) by 747 days.

(21) Appl. No.: 11/206,927

(22) Filed: Aug. 18, 2005

(65) Prior Publication Data
US 2005/0276739 A1    Dec. 15, 2005

Related U.S. Application Data

(63) Continuation-in-part of application No. 10/796,120, filed on Mar. 10, 2004, now Pat. No. 7,534,399.

(51) Int. Cl.
F01N 3/10 (2006.01)
(52) U.S. Cl. ...................... 422/173; 588/900
(58) Field of Classification Search ............... 423/168, 423/173, 177; 588/900
See application file for complete search history.

(56) References Cited

U.S. PATENT DOCUMENTS

| | | | |
|---|---|---|---|
| 4,801,437 A | 1/1989 | Konogaya et al. |
| 4,833,877 A | 5/1989 | Ahland et al. |
| 5,353,829 A | 10/1994 | Shiban |
| 5,662,722 A | 9/1997 | Shiban |
| 5,699,826 A | 12/1997 | Shiban |
| 5,759,498 A | 6/1998 | Sheu et al. |
| 5,832,843 A | 11/1998 | Park et al. |
| 5,997,824 A | 12/1999 | Kim |
| 6,030,584 A | 2/2000 | Shiban |
| 6,030,585 A | 2/2000 | Shiban |
| 6,153,150 A | 11/2000 | Moore et al. |
| 6,315,960 B1 | 11/2001 | Shiban |
| 6,333,010 B1 | 12/2001 | Holst et al. |
| 6,423,284 B1 | 7/2002 | Arno et al. |
| 6,425,754 B1 | 7/2002 | Lindskog |
| 6,464,944 B1 | 10/2002 | Moore et al. |
| 6,511,641 B2 | 1/2003 | Herman et al. |
| 6,514,471 B1 | 2/2003 | Hsiung et al. |
| 6,544,483 B1 | 4/2003 | Kim |
| 6,627,162 B1 | 9/2003 | Chen |
| 7,033,550 B2 | 4/2006 | Kanno et al. |
| 2001/0000724 A1 | 5/2001 | Choate et al. |
| 2001/0001645 A1 | 5/2001 | Lee et al. |
| 2002/0018737 A1 | 2/2002 | Holst et al. |
| 2002/0081240 A1 | 6/2002 | Kim |
| 2003/0047070 A1 | 3/2003 | Flippo et al. |
| 2003/0049182 A1 | 3/2003 | Hertzler et al. |
| 2003/0138367 A1 | 7/2003 | Brady et al. |
| 2003/0175176 A1 | 9/2003 | Ikeda et al. |
| 2005/0201913 A1* | 9/2005 | Shiban ............... 423/210 |

FOREIGN PATENT DOCUMENTS

| | | |
|---|---|---|
| FR | 9710479 | 1/1999 |
| GB | 2303803 | 7/1999 |
| JP | 7204482 | 8/1995 |
| WO | WO 02/058824 | 8/2002 |

* cited by examiner

*Primary Examiner*—Edward M Johnson
(74) *Attorney, Agent, or Firm*—James Creighton Wray; Meera P. Narasimham (57) ABSTRACT

A hazardous gas abatement system decontaminates an exit gas stream containing global warming or contaminant gases using an electrical heater compartment and a water scrubber or dry chemicals in a tank. One or more top flow hazardous gas inlets introduce hazardous gases into a heater compartment. Air or oxygen is heated in a separate chamber surrounding the heater compartment. The heated streams are mixed and oxygen reacts with the hazardous gases. Solid particulates and heat are removed by a filter in a quick disconnect tank. Gas flows through an outer chamber insulated from surrounding the heater compartment and through water spray scrubbers or chemical agents. A heat exchanger surrounds the outer chamber. A moving cleaning ring cleans particles from the heater compartment. An air cylinder drives the cleaning ring up and down.

18 Claims, 7 Drawing Sheets

HAZARDOUS GAS ABATEMENT SYSTEM USING ELECTRICAL HEATER AND WATER SCRUBBER

This application is a continuation-in-part of U.S. Ser. No. 10/796,120, filed Mar. 10, 2004, now U.S. Pat. No. 7,534,399 which is hereby incorporated by reference in its entirety.

BACKGROUND OF THE INVENTION

The present invention relates to a method and apparatus for hazardous gas abatement and emission control. Contaminated gas is decomposed, cleaned and neutralized. The present invention is particularly useful for global warming gases and other hard to decompose gases. These gases may include perflourocarbons (PFCs), tetraflouromethane ($CF_4$), hexaflouroethane ($C_2F_6$) and many other ozone depleting global warming and greenhouse gases. The present system is also useful for decomposing the exit stream of a semiconductor process by removing gases such as arsine ($AsH_3$) or phosphine ($PH_3$). High temperatures are required to clean, neutralize and decompose these types of gases.

Existing systems do not provide adequate heating to effectively cleanse exit gas streams of global warming gases. Previous gas cleaning systems include controlled decomposition/oxidation (CDO) and others. These previous systems suffered from low efficiency in performance and considerable downtime of equipment during maintenance. Industries, such as the semiconductor industry, have a considerable need for gas cleansing systems in order to comply with environmental emissions codes and regulations.

In existing gas cleaning systems heaters are used. However, the heaters insufficiently heat all of the gases, and the heaters become fouled and unable to efficiently transfer heat. They also become so burdened with particulate contaminants or reaction products as to interfere with free flow of gases through the cleaning systems. Periodic cleaning of the heaters and the chambers becomes necessary, which requires shutting down of the systems or taking the treatment apparatus off line, resulting in duplicate systems and greater expense. If the systems are not cleaned contaminated gases will be released.

Needs exist for improved apparatus and systems for cleaning heater compartments in contaminated gas treatment methods and apparatus.

Needs still exist for improved systems for neutralizing, pacifying and cleaning contaminated chemical process exhaust and waste gases.

Needs exist for improved systems, which efficiently neutralize chemical process exhaust gas hazardous components and contaminates. The system should ensure complete or substantially complete neutralization and pacification of any out flowing contaminant gas in the gas stream to be neutralized. Needs exist for systems that are simple and inexpensive to build and to operate and that do not require a fuel source to operate.

Needs exist for systems that are capable of handling spent process gas streams that have contaminate gas concentrations from trace to substantial amounts in volumes of cubic centimeters to several tens or hundreds of liters per minute.

SUMMARY OF THE INVENTION

The present invention is a hazardous gas abatement system for reacting global warming, greenhouse and/or ozone depleting gases using an electrical heater and a water scrubber. The present invention provides higher temperatures and increased contact surfaces for decomposing the subject hazardous gases when compared with previous systems.

Preferably, but not limited to, one or more, or about one to four top flow hazardous gas inlets introduce hazardous gases into a heater compartment where the toxic gases are heated to approximately 1100 C. The hazardous gases flow into the heater compartment surrounded by an outer heater. An inner heater is positioned with respect to the outer heater to create additional heat and contact surfaces for higher gas temperatures. An air inlet introduces air into the cleaning system separate from the hazardous gases. The air is fed around the outside of an external heater for cooling and dynamic oxidation. After the hazardous gases and the air are heated, the two gas streams flow downward in the apparatus and meet below the heater compartment. Oxygen in the air reacts with the heated hazardous gases. When the gases have reacted, the exit gas stream passes through a filter at the base of the cleaning device for removal of solids. A quick disconnect clamp on the bottom of the cleaning system is used to periodically remove the filter for cleaning and removal of accumulated solids. After passing through the filter, exhaust gases flow upward in a chamber outside the heater compartment and then through water spray scrubbers that cool and scrub the gases.

A cleaning ring with an eccentric shaft cleans the entry point of the hazardous gas inlets, the outside of the internal heater, and the inside of the external heater. An air cylinder drives the eccentric shaft up and down between the heaters and along the gas inlets. The cleaner removes particles from the exposed surfaces of the heaters as it moves. The cleaning ring has an inner and outer surface for cleaning the inner heater and outer heater simultaneously. When not in use, the cleaner is positioned above the first and second gas inlets and away from the passage of contaminant gases and oxygen. In addition to cleaning the surfaces of the heaters, the cleaner also cleans the entry points of the gas inlets to prevent build-ups.

In an alternative embodiment of the contaminated gas treatment apparatus the cleaning plate continuously moves up and down. This generates high turbulence in the gas stream for increasing contact time between gas molecules and hot surfaces. The cleaning plate itself may be heated for increasing the temperature of the gas molecules. Furthermore, the turbulence helps to increase residence time of the gas in the heater compartment. The cleaning plate may move up and down the heaters approximately 30 to 60 times per minute.

The cleaning plate may have openings between the outer cleaning surface and the inner cleaning surface for allowing flow of gas through the cleaning plate. This prevents blocking of gas flow and maintains constant backpressure for vacuum pumps.

The present invention may also have short rods mounted on a return position of the cleaning plate for keeping the cleaning plate openings clear of debris. Similar devices are described in U.S. Pat. No. 5,699,826, which is hereby incorporated by reference in its entirety. An operator moves the short rods across the openings in the cleaning plate.

Preferably, but not exclusively, the heater compartment, outer heater and inner heater are cylindrical. The cleaner is annular and coaxial with the outer heater. An operator, offset from a center of the cleaning system, moves the cleaner between the outer surface and the inner heater surfaces. The operator is a reciprocation device extending from an end of the treatment apparatus and a rod extending into the heater compartment and connected eccentrically to the annular cleaner for extending in a space between the heaters as the reciprocating device moves the cleaner.

Water sprays are also used for cooling and scrubbing of exhaust gases. A water scrubbing zone is positioned after the filter, but before exhaust gas leaves the apparatus. Moisture may also be introduced in the hazardous gas inlet or heater compartment in the form of steam or water. This addition of moisture reduces contaminants and possible damage to the heater compartment and other components by converting fluorine gas to hydrofluoric acid.

An exhaust system includes an exhaust chamber connected to the filter chamber and surrounds the second heater. An exhaust outlet is connected to the exhaust chamber for removing exhaust gases from the exhaust chamber. Water sprays may be found in the exhaust chamber for cooling and scrubbing exhaust gases in the exhaust chamber.

Alternatively, a heat exchanger may surround the exhaust chamber for cooling the exhaust gases in the exhaust chamber. The heat exchanger may be a series of tubes or a water jacket surrounding the second heater. When a heat exchanger is used for cooling, the water or other cooling liquid does not contact the exhaust gases. This eliminates the need for treating the water or other cooling liquid or for any special drainage requirements.

In another embodiment, a dry scrubber abatement system uses an electrical heater within a hot zone tube for heating hazardous gas. Gas enters the system through a gas inlet. A lower plenum feeds the hot gas through a non-combustible annular stainless steel filter mesh to cool the gas and to feed the gas to an annular chemical agent particulate stack, where the dry scrubber particles absorb hazardous by-products such as HF, arcine or arcinic byproducts.

The annular filter is a non-combustible stainless steel filter mesh.

The tank-cartridge holds the filter and a dry scrubber agent.

The chemical agent tank with the filter is removable, sealable with a top plate and shippable either by itself or within a gas-tight container to a remote location for regeneration.

The heater and an insulation/scraper assembly is a unit within the tank and may be withdrawn vertically from the tank. The tank is annular.

An annular stainless steel filter is positioned in the bottom of the tank, and the tank is filled with particulate chemical agent. The chemical agent may be, for example, aluminum oxide, carbonated compounds, zeolite or other agents to remove HF, arcine or arcinic byproducts or other pollutants from the gas. The stainless steel filter mesh primarily removes heat from the waste gas before it enters the chemical agent. The filter transfers heat to the tank wall and through the tank wall to air circulated through a surrounding cabinet air jacket.

The tank is enclosed within an air jacket in a cabinet to remove heat and cool the tank, the filter and the chemical agent. Clean air exits the system in an exit stack.

For removal and replacement, the tank may be unbolted from a top plate. The tank is lowered with or through the outer cabinet after detaching the tank or the tank and the cabinet from the top plate and heater assembly. Alternatively, the entire assembly may be unbolted from the heat source and hazardous gas inlet and lowered. Then the heater assembly with the heater pipe, insulator and movable scraper may be withdrawn vertically from the tank after removing bolts which hold the heater assembly, the chemical agent tank and the cabinet housing assembled on the mounting plate.

Outer bolts may be removed, and the chemical agent tank may be removed from the mounting plate. A disc-like cover may be bolted to or snapped on the removed chemical agent tank to seal the tank. If required, the tank may be placed in a sealed shipping container for transportation to a chemical agent regeneration facility.

A chemical agent may be located downstream from a hot area in a chemical agent tank. In some applications, the chemical agent may be affected by heat transfer. Therefore, it is possible to locate the chemical agent downstream of hot areas in a chemical agent tank. The filter may be extended through the tank in order to reduce the temperature of the gas to a temperature that will not adversely affect the chemical agent in the chemical agent tank.

Alternatively, the heater chamber may be square or rectangular with no central heater tube. Ceramic fiber heaters, or other types of heaters, run along one or more faces of the heater chamber for heating the contaminant gas.

The present invention efficiently neutralizes, pacifies and cleans contaminated chemical process exhaust and waste gases and allows for easy cleaning of the heater compartment. The present invention ensures complete or substantially complete neutralization and pacification of any out flowing contaminant gas in the gas stream to be neutralized. The system is also simple and inexpensive to build and to operate. The systems is capable of handling spent process gas streams that have contaminate gas concentrations from trace to substantial amounts in volumes of cubic centimeters to several tens or hundreds of liters per minute.

These and further and other objects and features of the invention are apparent in the disclosure, which includes the above and ongoing written specification, with the drawings.

DETAILED DESCRIPTION OF THE PREFERRED EMBODIMENTS

The present invention is a hazardous gas abatement system for reacting global warming, greenhouse and/or ozone depleting gases using an electrical heater and a water scrubber. The present invention ensures complete or substantially complete neutralization and pacification of any out flowing contaminant gas in the gas stream to be neutralized.

Figure 1:
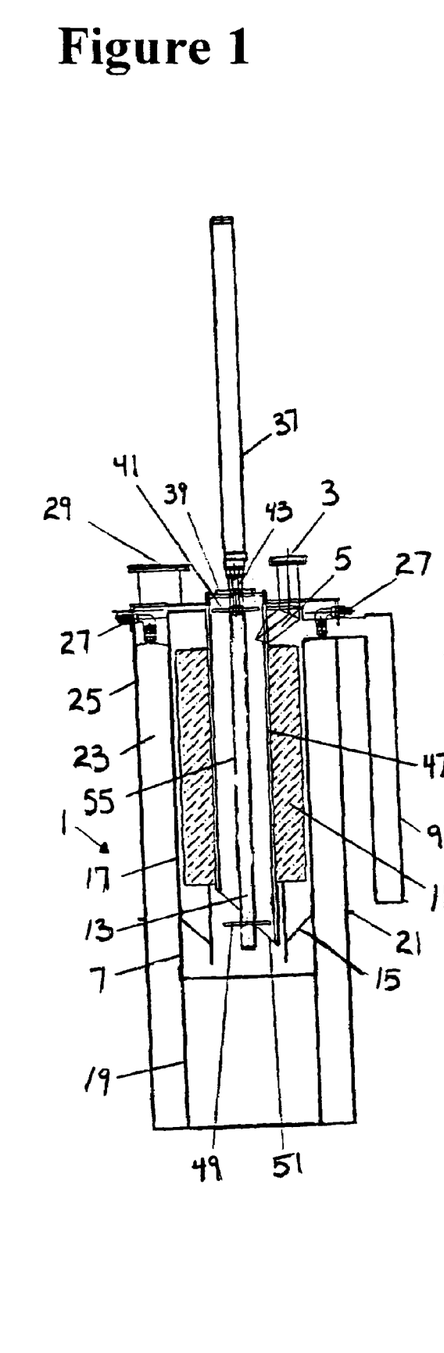
FIG. 1 is a side cross sectional view of the hazardous gas abatement system.

FIG. 1 is a side cross sectional view of the hazardous gas abatement system 1. Contaminated gases that are in need of neutralization and pacification are taken from a process stream. The contaminated gases feed into the hazardous gas abatement system 1 through a top flow hazardous gas inlet 3. The hazardous gas inlet 3 introduces the contaminated gases through an entry point 5 that is attached to a heater compartment 7. In order to carry out the neutralization and pacification of the contaminated gas, the contaminated gas is heated to temperatures of approximately 1100 C.

An air inlet 9 introduces an air stream into the cleaning system 1. Air is introduced near the top of the abatement system 1. Both the contaminated gas stream and air stream may be pumped into the abatement system 1 or may be drawn into the system 1 by a slight negative pressure within the vessel.

The contaminated gases leave the entry point 5 and move into the top of the heater compartment 7. Gas flow in the heater compartment 7 is in a generally downward direction. At least one electric heater 11 is located within the heater compartment 7. A second electric heater 13 may also be present. Walls 15 and other devices control gas flow and provide support for structures within the heater compartment 7. The contaminated gases flow downward through the heater compartment 7, between the inner 13 and outer 11 heaters. The use of a second heater 13 creates a second heat source and increases contact surfaces to ensure higher gas temperatures. The electric heaters 11, 13 heat the contaminated gases to remove some of the contaminants.

After entering the system 1, the air stream flows downward between the external heater 11 and the heater compartment walls 17. Dynamic oxidation occurs as the air flows around the external heaters 11 and the insulation on the heater 11 is cooled. The pre-heated air stream exits the region between the external heater 11 and the heater compartment walls 17 through vent 15.

At the base of the heater compartment 7, the contaminated gases exit the heater compartment 7 and mix with the pre-heated air stream. The two gas streams react to decompose the contaminated gases. At the base of the system 1, a filter 19 removes reacted solids from the combined gas stream. The filter 19 is periodically removed for maintenance and to clean out accumulated solids by means of a quick disconnect clamp 21 on the bottom of the heater compartment 7.

The filtered exhaust gases flow upward in a chamber 23, outside the heater compartment 7 and inside the outer wall 25 of the apparatus 1. Prior to exiting the abatement system 1, the filtered exhaust gases pass through a system of water spray scrubbers 27 that cool the exit stream and further remove contaminants from the exhaust gas. After being scrubbed by the water sprays 27, the substantially cleaned exhaust gases are exhausted through an exhaust vent 29. The exhaust is composed of water vapor, air and cleaned gas.

Figure 2:
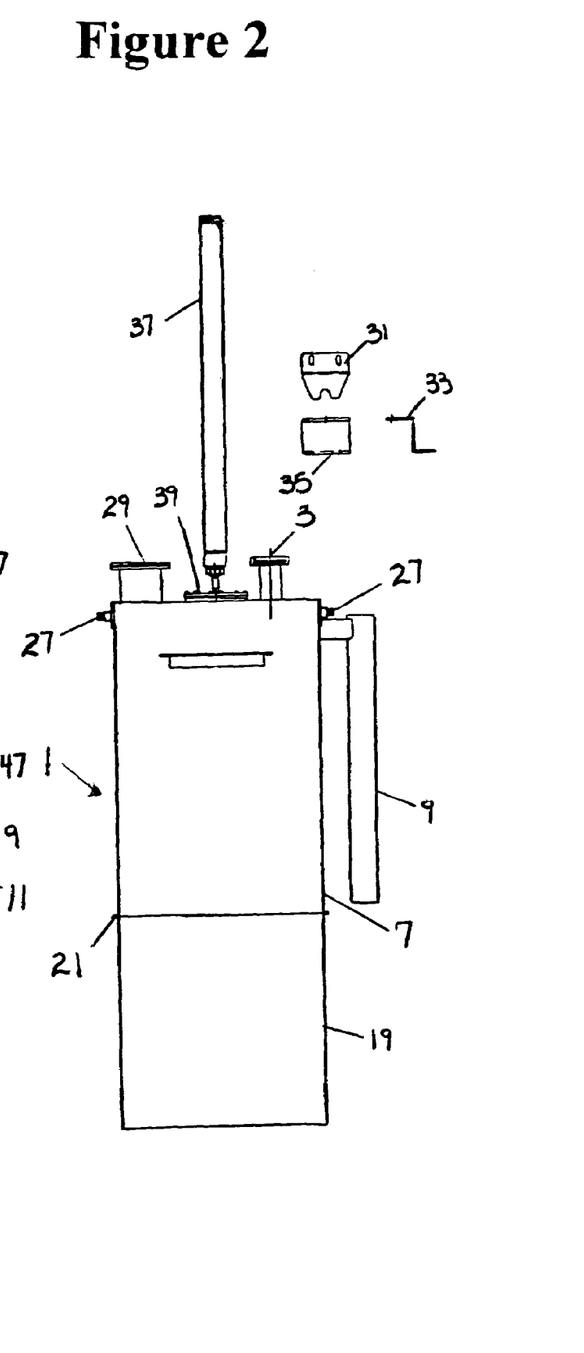
FIG. 2 is a side view of the hazardous gas abatement system.

FIG. 2 is an exterior side view of the hazardous gas abatement system 1. FIG. 2 also shows components 31, 33, 35 that are used to secure an air cylinder 37 onto the top 39 of the abatement system 1.

Figures 3, 4:
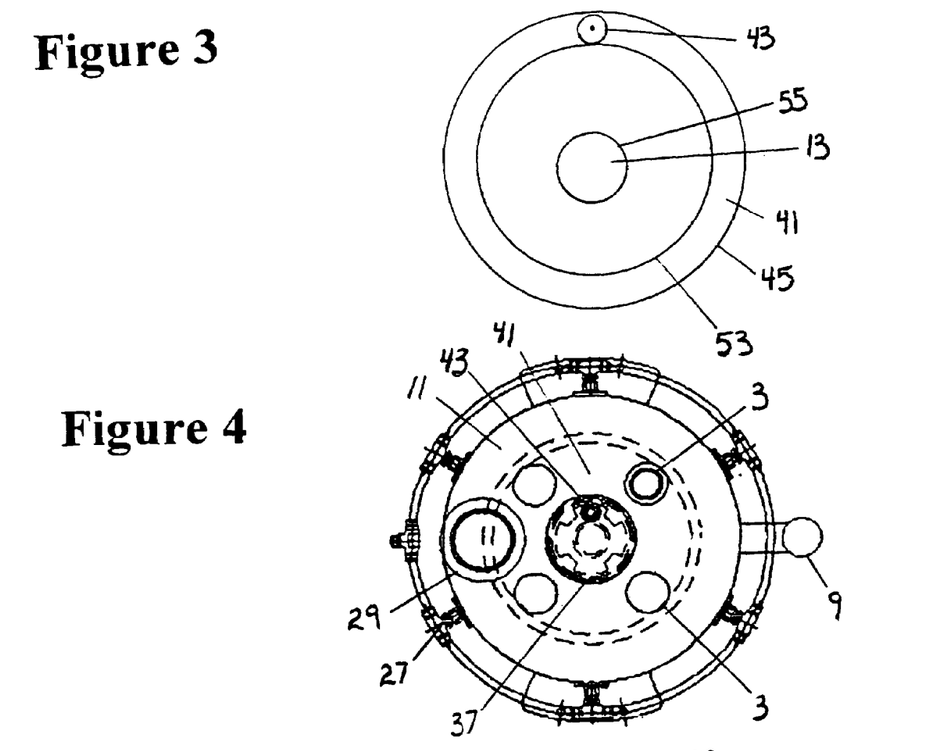
FIG. 3 is a top view of the cleaning ring with eccentric shaft.
FIG. 4 is a top view of the hazardous gas abatement system.

FIG. 3 is a top view of a cleaning ring 41 with an eccentric shaft 43. The decomposition of the contaminated gases results in the buildup of a solid residue within the heater compartment 7. The filter 19 captures and collects many of the solid particles created from the process. However, decomposition occur throughout the length of the heater compartment 7, including along the exposed surfaces of the heaters 11, 13. As a result, solid particles form on the heaters 11, 13 and reduce the heating efficiency of the heaters 11, 13. In order for the abatement system 1 to work effectively, the heaters 11, 13 must be cleaned frequently to remove solid particles on the heaters. In previous systems, the process needed to be shut down and opened for cleaning. In the present invention, the heaters 11, 13 can be cleaned without extended disruptions of the abatement system 1.

In an embodiment of the present invention with one heater, the cleaning ring 41 has an outer surface 45 in close proximity to the internal surface 47 of the heater 11. The outer surface 45 of the cleaning ring 45 is used to scrape solid particles off the heater 11. The cleaning ring 41 is positioned above the hazardous gas inlet 5 when the cleaning ring 41 is not in use. This positioning keeps the cleaning ring 41 away from the passage of contaminant gases, preventing solid buildup on the cleaning ring 41 itself and preventing the cleaning ring 41 from disturbing the flow of gases in the heater compartment 7.

During cleaning, the cleaning ring 41 is depressed from its initial position above the gas inlet 3 by the air cylinder 37. The air cylinder 37 provides force necessary to propel the cleaning ring 41 along the sides of the heater 11 while scraping solid particulates off the heater 11 and down toward the filter 19. In addition to cleaning the surface of the heater 11, the cleaning ring 41 also cleans the entry points of the gas inlets 3 to prevent buildups that would stifle the flow of gases. The cleaning ring 41 proceeds down the inner walls 47 of the heater 11 until it reaches a stop 49. The inner walls 47 of the heater 11 are designed such that the cleaning ring 41 scrapes solid buildup from the entirety of some of the walls 47, but not all of the walls 47. Part of the inner walls 47 are tapered 51 and extend below the stop 49 to prevent the cleaning ring 41 from becoming misaligned. When the cleaning process is completed, the air cylinder 37 retracts the cleaning ring 41 to its initial position.

In an embodiment of the present invention with multiple heaters 11, 13, a cleaning ring 41 has an inner 53 and outer 45 surface to clean an inner 13 and outer 11 heater of solid particles. The outer surface 45 of the cleaning ring 41 is in proximity to the inner surface 47 of the first heater 11. The inner surface 53 of the cleaning ring 41 is in proximity to an outer surface 55 of the second heater 13. The cleaning ring 41 encircles the second heater 13. The cleaning process with multiple heaters 11, 13 is similar to the cleaning process for a single heater 11. An air cylinder 37 depresses the cleaning ring 41 until reaching a stop 49. The air cylinder 37 then retracts the cleaning ring 41 to its initial position. The air cylinder 37 acts on the cleaning ring 41 through an offset shaft 43.

The cleaning ring 41 with its eccentric shaft 43 is used to clean the entry point of the gas inlets 3, the outside of the internal heater 55, and the inside of the external heater 47. The cleaning ring 41 removes particles from the heaters' 11, 13 exposed surfaces as it moves. The cleaning ring 41 cleans the inner heater 13 and outer heater 11 simultaneously. There is no need to disassemble the abatement system 1 in order to remove solid particles from the heaters 11, 13.

FIG. 4 is a top view of the exterior of the hazardous gas abatement system 1. In a preferred embodiment of the present invention, the heater compartment 7, outer heater 11 and inner heater 13 may be concentric cylinders. As a result, the cleaning ring 41 is annular and coaxial with the outer heater 11. An operator 43, offset from a center of the apparatus 1, moves the cleaning ring 41 between the outer 55 and the inner 47 heater surfaces. The operator 43 is a reciprocation device extending from an end of the treatment apparatus 1 and a rod extending into the heater compartment 7. The operator 43 is connected eccentrically to the annular cleaner 41 for extending in a space between the heaters 11, 13 as the reciprocating device moves the cleaning ring 41. The cleaning ring 41 is placed in close proximity to the heater surfaces 47, 55 to ensure adequate cleaning, but the cleaning ring 41 is not in contact with these surfaces 47, 55.

Figure 5:
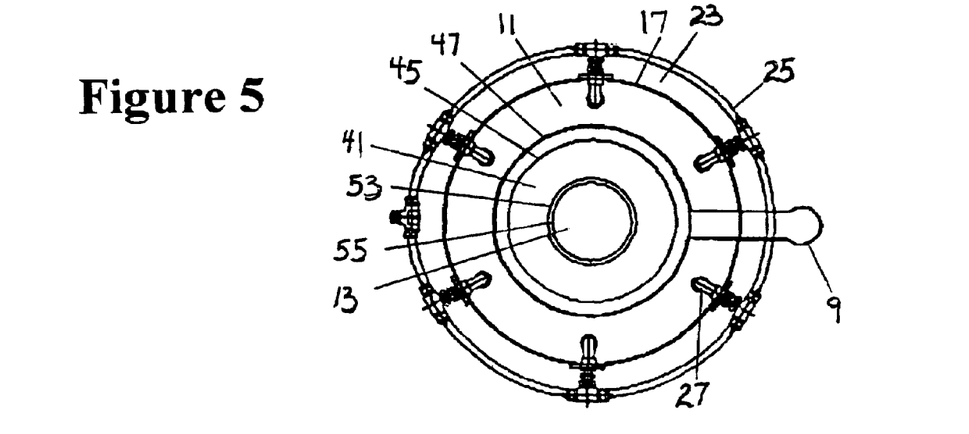
FIG. 5 is a top cross sectional view of the hazardous gas abatement system.

FIG. 5 is a top cross sectional view of the hazardous gas abatement system 1. Water sprays 27 are used for cooling and scrubbing of exhaust gases. A water scrubbing zone is positioned after the filter 19, but before exhausting the gases out of the apparatus 1 via the exhaust duct 29. The introduction of water into the system helps to further scrub the contaminated gases and cools the exit stream. Moisture may also be introduced in the earlier in the cleaning system 1 in the form of steam or water. Water sprays 27 may be reconfigured to dispense water or steam into the oxygenator 5 as well as the exit flow region 23 after the filter 19. This addition of moisture in the form of water or steam reduces contaminants in the hazardous gas stream. Moisture also reduces the possible damage to the heater compartment 7 and other components by converting fluorine gas to hydrofluoric acid. Hydrofluoric acid is less damaging to the equipment than fluorine in the gaseous form.

Figure 6:
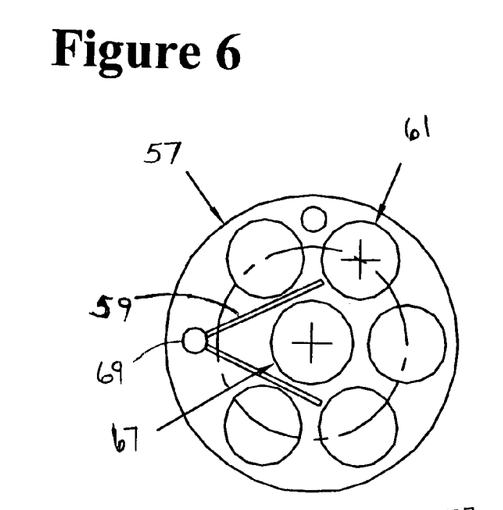
FIG. 6 is a top view of a cleaning plate with short rods and openings.
Figure 7:
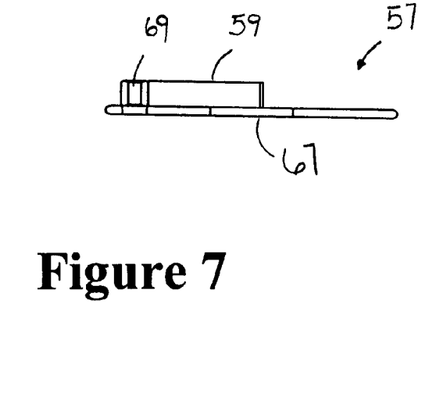
FIG. 7 is a side view of a cleaning plate with short rods and openings.

FIGS. 6 and 7 show an alternative cleaning plate 57 with short rods 59 and openings 61. In an alternative embodiment of the contaminated gas treatment apparatus 1 the cleaning plate 57 continuously moves up and down the length of the heaters 11, 13. This generates high turbulence in the gas stream for increasing contact time between gas molecules and hot surfaces. The cleaning plate 57 may be heated for increasing the temperature of the gas molecules. Furthermore, the turbulence helps to increase residence time of the gas in the heater compartment. The cleaning plate 57 may move up and down the heaters 11, 13 approximately 30 to 60 times per minute.

The cleaning plate 57 has openings 61 between the outer cleaning surface 53 and the inner cleaning surface 55 for allowing flow of gas through the cleaning plate 57. This prevents blocking of gas flow and maintains constant back-pressure for vacuum pumps. A central opening 67 allows the cleaning plate 57 to pass around the inner heater 13.

The present invention may also have short rods 59 mounted on a return position of the cleaning plate 57 for keeping the cleaning plate openings 61 clear of debris. The short rods 59 and an operator may be connected at a single point 69 or at different points. Similar devices are described in U.S. Pat. No. 5,699,826, which is hereby incorporated by reference in its entirety. An operator moves the short rods across the openings in the cleaning plate.

Figure 8:
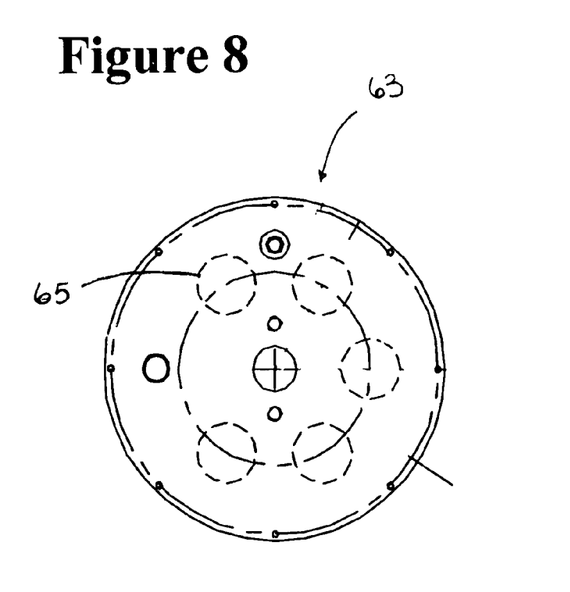
FIG. 8 is a top view of a cleaning plate with extended openings.
Figure 9:
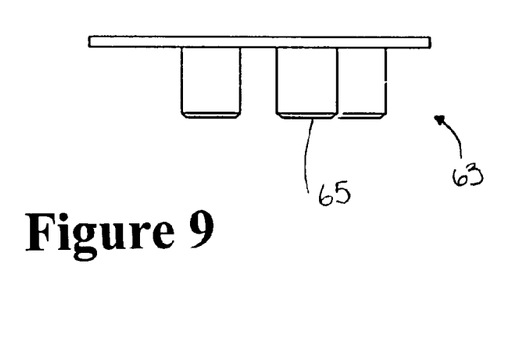
FIG. 9 is a side view of a cleaning plate with extended openings.

FIGS. 8 and 9 show an alternative cleaning plate 63 with extended openings 65.

An exhaust system includes an exhaust chamber connected to the filter chamber and surrounds the second heater. An exhaust outlet is connected to the exhaust chamber for removing exhaust gases from the exhaust chamber. Water sprays may be found in the exhaust chamber for cooling and scrubbing exhaust gases in the exhaust chamber.

Alternatively, a heat exchanger may surround the exhaust chamber for cooling the exhaust gases in the exhaust chamber. The heat exchanger may be a series of tubes or a water jacket surrounding the second heater. When a heat exchanger is used for cooling, the water or other cooling liquid does not contact the exhaust gases. This eliminates the need for treating the water or other cooling liquid or for any special drainage requirements.

The present invention efficiently neutralizes, pacifies and cleans contaminated chemical process exhaust and waste gases and allows for easy cleaning of the heater compartment 7. The present invention ensures complete or substantially complete neutralization and pacification of any out flowing contaminant gas in the gas stream to be neutralized. The system is also simple and inexpensive to build and to operate and does not require a fuel source to operate. The systems is also capable of handling spent process gas streams that have contaminate gas concentrations from trace to substantial amounts in volumes of cubic centimeters to several tens or hundreds of liters per minute.

Figure 10:
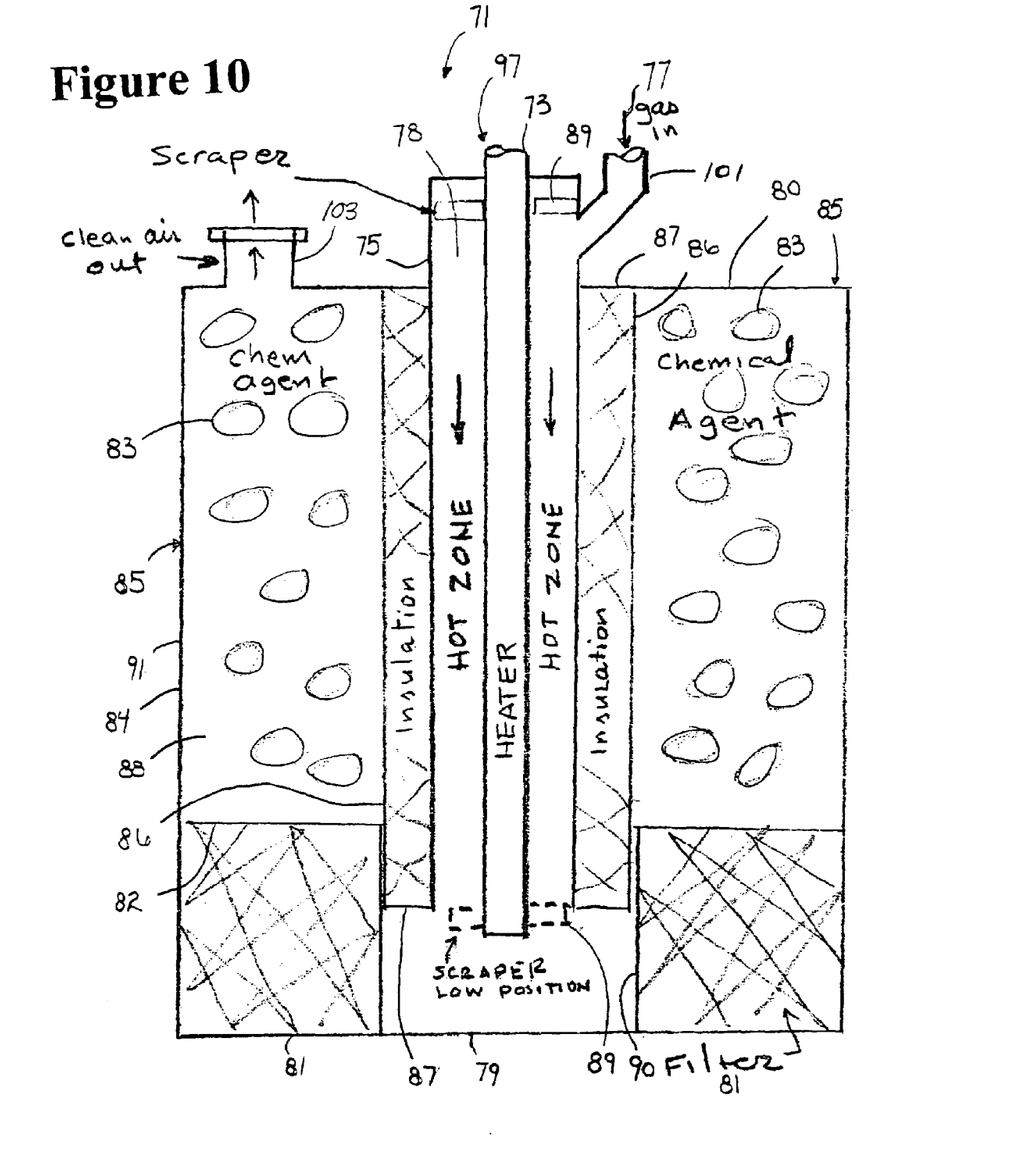
FIGS. 10 and 11 are schematic cross-sections of dry scrubber abatement systems using an electrical heater within a hot zone tube for heating hazardous gas.
Figure 11:
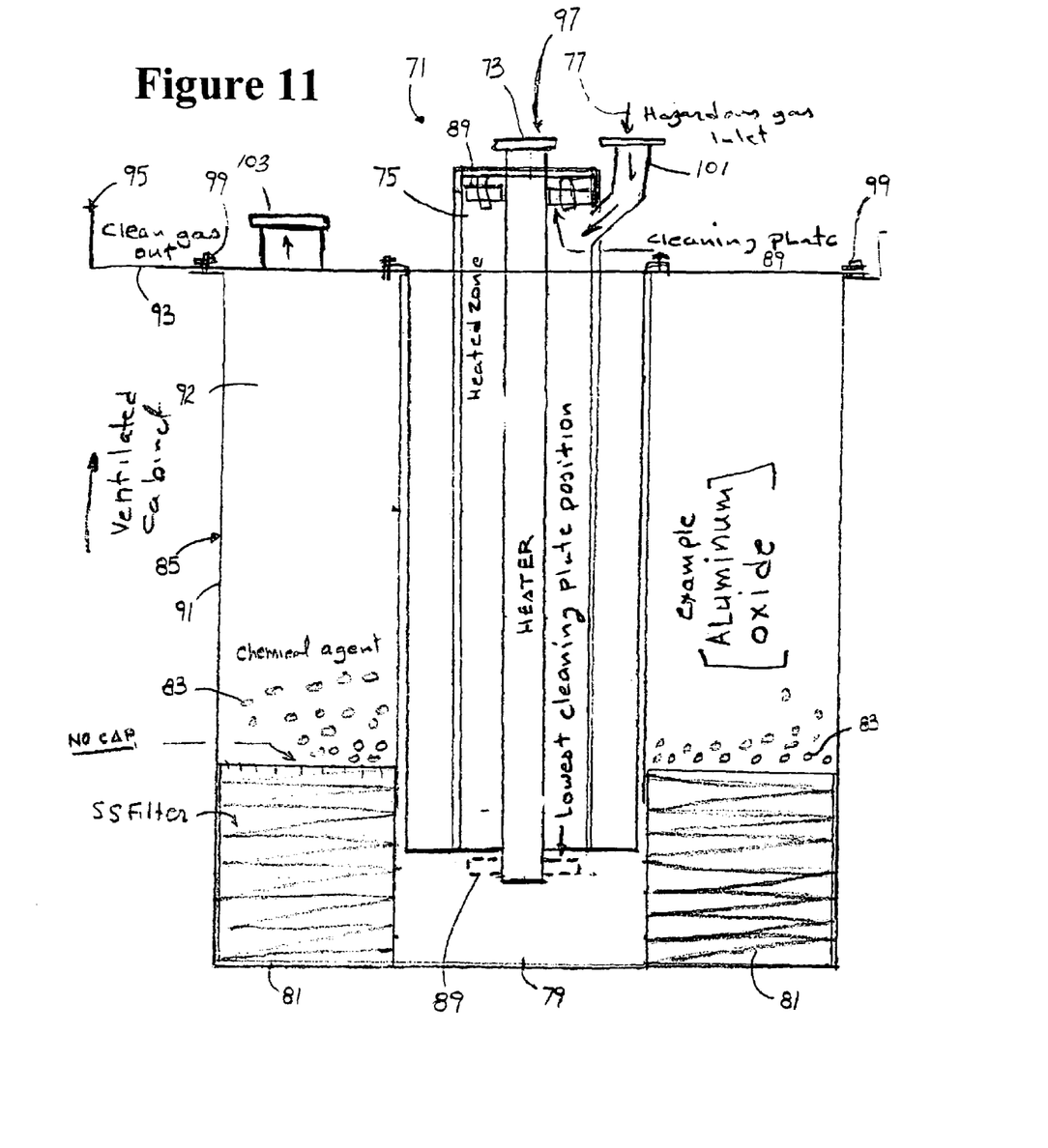

FIGS. 10 and 11 are schematic cross-sections of a dry scrubber abatement system 71 using an electrical heater 73 within a hot zone outer tube 75 for heating incoming hazardous gas 77 in a hot zone 78 between the outer tube 75 and the heater 73. Gas 77 enters the system through a gas inlet 101. A lower plenum 79 feeds the hot gas 77 through a non-combustible annular stainless steel filter mesh 81 to cool the gas and to feed the gas to chemical agent particles 83 annularly arranged in tank 85 as a particulate stack 88. The dry scrubber particles 83 absorb hazardous by-products such as HF, arcine or arcinic byproducts. Tank 85 has a top 80, a bottom 82, an outer cylindrical wall 84 and an inner cylindrical wall 86 spaced from the bottom.

The annular filter 81 is a non-combustible stainless steel filter mesh. The tank-cartridge 85 holds the filter 81 and the dry scrubber agent particles 83.

Annular cylindrical insulation 87 is positioned between the inner cylindrical wall 86 of the tank 85 and the hot zone outer tube 75 to reduce heat transfer from the hot zone wall to the particulate stack 88. A scraper 89 periodically translates mechanically up or down to clean the walls of the hot zone 78.

The chemical agent tank 85 with the filter 81 is removable, sealable with a top plate and shippable either by itself or within a gas-tight container to a remote location for regeneration.

The heater 73 outer hot zone wall 75, insulation 87 and scraper 89 are an assembly 97 unit within the tank 85 and may be withdrawn vertically from the tank 85, while the annular tank 85 is being removed.

The annular stainless steel mesh filter 81 is positioned on the bottom of the tank 85, and is held within a lower edge portion of inner cylindrical tank wall 86. The annular space above the filter 81 in the tank 85 is filled with particulate chemical agent 83. The chemical agent 83 may be, for example, aluminum oxide, carbonated compounds, zeolite or other agents to remove HF, arcine or arcinic byproducts or other pollutants from the gas. The stainless steel filter mesh 81 primarily removes heat from the waste gas before it enters the chemical agent 83. The filter 81 transfers heat to the tank wall 91 and through the tank wall 91 to air circulated through a surrounding cabinet 95 air jacket.

The tank 85 is enclosed within an air jacket cabinet 95 to remove heat and cool the tank 85, the filter 81 and the chemical agent 83. Clean air exits the system in an exit stack 103.

For removal and replacement, the tank 85 may be unbolted from a top plate 93. The tank 85 is lowered with or through the outer cabinet 95 after detaching the tank 85 or the tank 85 and the cabinet 95 from the top plate 93. The heater assembly 97 remains attached to the top plate. Alternatively, the entire assembly may be unbolted from the heat source and hazardous gas inlet and lowered. Then the heater assembly 97 with the heater pipe 73, insulator 87 and movable scraper 89 may be withdrawn vertically from the tank 85 after removing bolts 99 which hold the heater 97 assembly, the chemical agent tank 85 and the cabinet housing 95 assembled on the mounting plate 93.

Outer bolts 99 may be removed, and the chemical agent tank 85 may be removed from the mounting plate 93. A disc-like cover may be bolted to or snapped on the removed chemical agent tank 85 to seal the tank 85. If required, the tank 85 may be placed in a sealed shipping container for transportation to a chemical agent regeneration facility.

In one example, a hazardous gas tank 85 of a hazardous gas dry scrubber 71 for laboratory use is about 24 to 48 inches high, preferably about 28 inches, and about 12 to 36 inches, preferably about 16 inches, in diameter. The tank has an inner cylinder 86, a closed outer cylindrical wall 84, a base 82 and an open top 80, which is sealed to the mounting plate 93. The inner cylinder 86 is about 11 inches in diameter and 21 inches long, is spaced from a hot zone tube 73 surrounding heater 73 and is suspended from cross-members on the top of the tank. The annular stainless steel filter 81 is about 8 inches tall with inner and outer diameters of about 11 inches and 16 inches, and fits within the outer cylindrical wall 84 and inner cylinder 86 of the tank 85.

An annular opening 90 into the filter 81 from the bottom plenum 79 is about 7 inches high by about 11 inches in diameter, providing about 240 square inches of area for flow into the filter.

Alternatively, the 11-inch tube 75 may extend all of the way to the base 82 of the tank 85, and the bottom of the tube may have large openings for flowing the heated gas into the filter.

The particular chemical agent 83 may be filled to a short distance from the top, leaving an upper plenum 92 through which cleaned gas passes laterally to the clean gas outlet 103, which is a two inch diameter pipe extending through the mounting plate 93.

In the laboratory use example, the heater assembly 97 has a 30 inch long 2 inch diameter heater pipe 73 surrounded by a 6 inch tube 75 which is about 28 inches long. The space between the heater pipe 73 and the surrounding tube 75 forms a heated hot zone 78, through which passes hazardous gas 77, which is admitted through an inlet pipe 101 radially welded near a top of the 6 inch tube 75. The inner cylinder 86 of the tank 85 extends around and is spaced from the 6 inch tube 75. The space between inner cylinder 86 and the tube 75 is filled with insulation 87 to insulate the chemical agent in the outer tank from the heated zone.

An annular cleaning plate 89 is slidable along the heated hot zone 78 to clean the heated zone 78, the outside of the heater 73 and the inside of the heated zone-enclosing tube 75. The heater pipe 73 extends into the approximately 4 inch× approximately 11 inch diameter lower plenum 79 in the tank 85. The extension allows particles to drop into the lower plenum upon translation of the cleaning plate 89 to its lowermost position along the heater pipe. The lower plenum allows the heated hazardous gas to flow outward slowly and uniformly through the cylindrical opening 90, into the annular stainless steel filter 81 and upward through the chemical agent 83.

Figure 12:
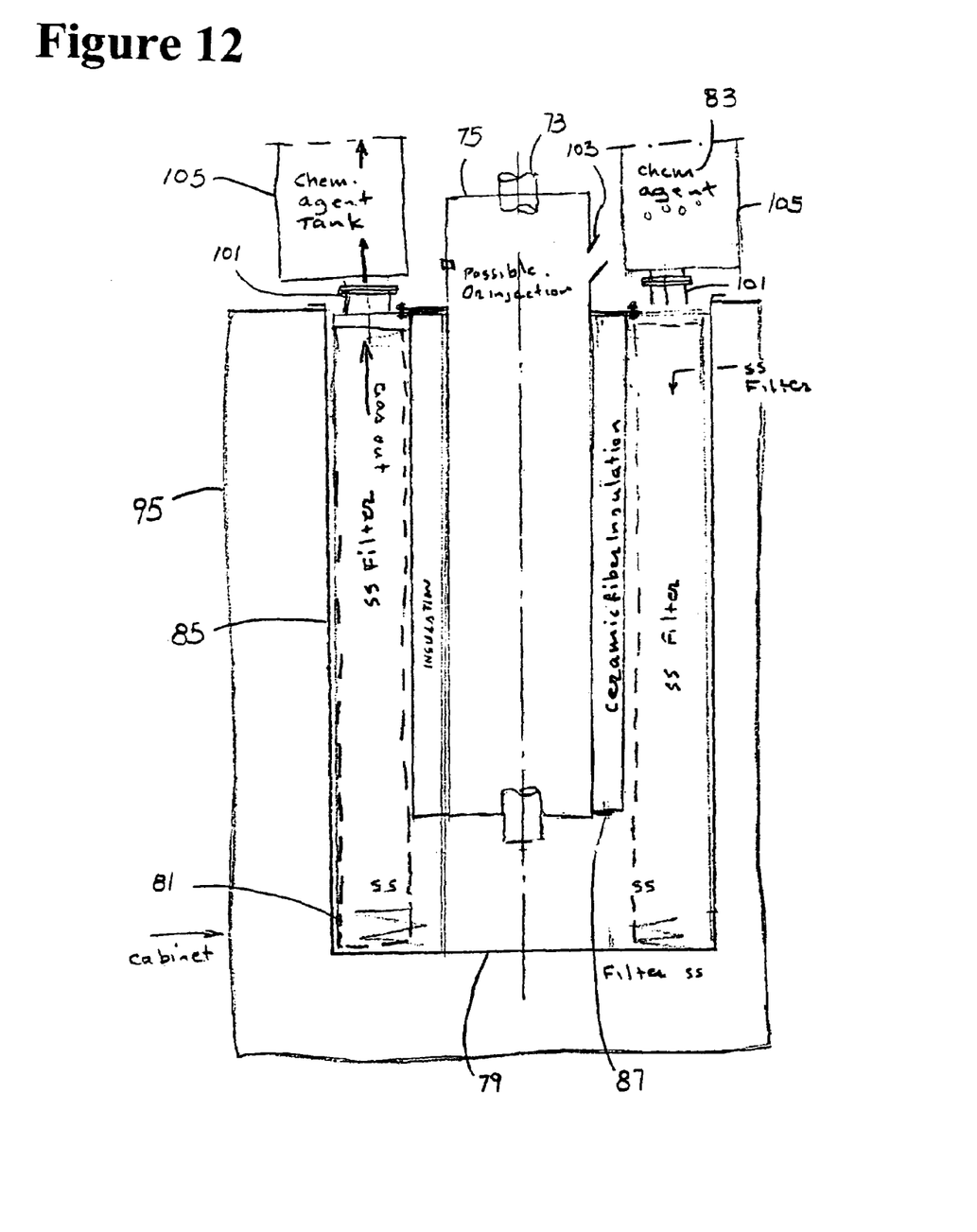
FIG. 12 is a schematic cross section of a gas abatement system with a chemical agent located downstream from a hot area.

FIG. 12 is a schematic cross section of a gas abatement system 71 with a chemical agent 83 located downstream from a hot area in a chemical agent tank 105. In some applications, the chemical agent 83 may be affected by heat transfer. Then it is preferable to locate the chemical agent 83 downstream out of hot areas in a separate chemical agent tank 105. The filter 81 may be extended upward through the tank 85 to reduce the temperature of the gas to a temperature that will not adversely affect the chemical agent 83 in the chemical agent tank 105.

Figure 13:
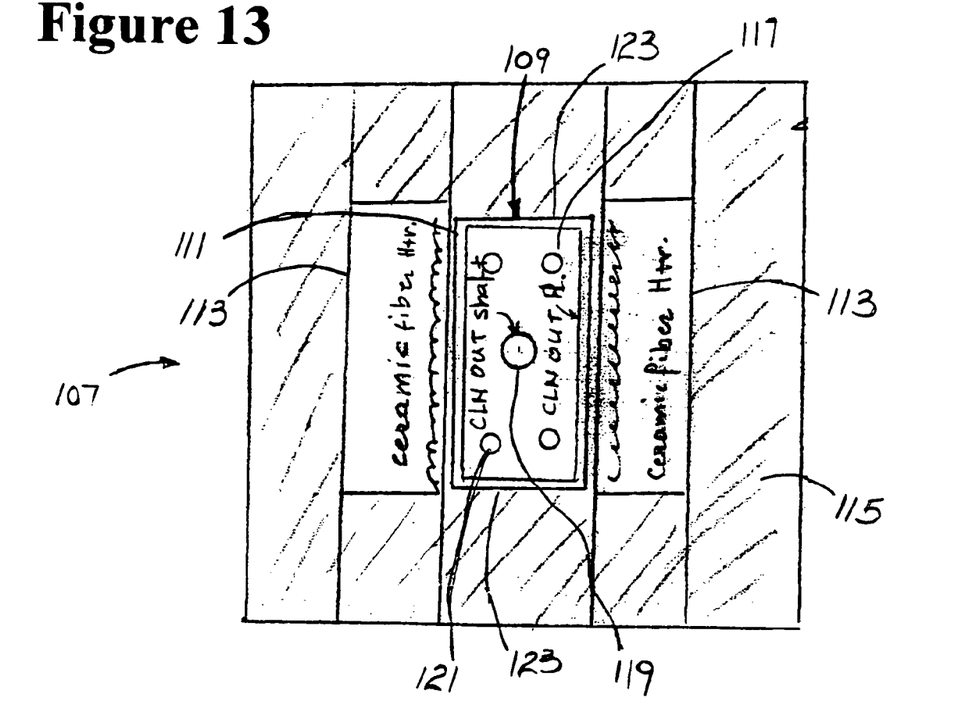
FIG. 13 is a top view cross section of a rectangular chamber.

FIG. 13 is a top view cross section of a rectangular chamber 107. A rectangular heater zone 109 may be for example, but not limited to, approximately 4" wide by 8" long by 18" high. The longer sides 111 of the heater zone 109 are made of ceramic fiber or other types of heaters 113. Insulation 115 surrounds the heaters 113 and the heater zone 109 on shorter sides 123. A cleaner 117 moves up and down the height of the heater zone 109, cleaning build up off the walls of the heater zone 109 as the cleaner 117 moves. The cleaner 117 is attached to a shaft actuator 119. Holes 121 in the cleaner 117 allow passage of gas.

Figure 14:
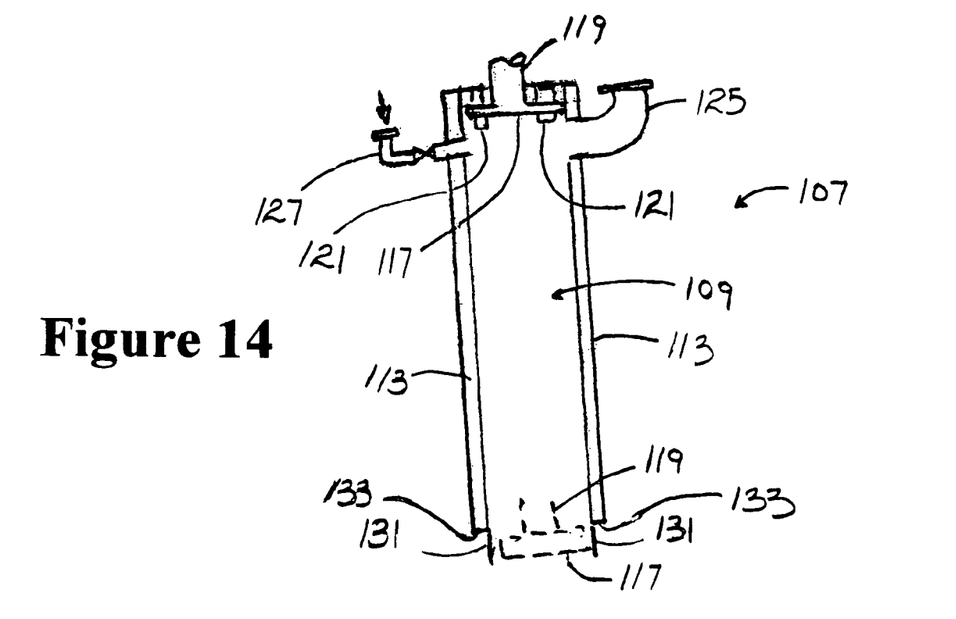
FIG. 14 is a side view cross section of a rectangular chamber.

FIG. 14 is a side view cross section of the rectangular chamber 107. A process gas inlet 125 allows process gas to enter the heater zone 109. Oxygen may be injected at an oxygen injection inlet 127. Clean out shafts 129 are located at the top of the heater zone 109. When the cleaner 117 rises to the top of the heater zone 109, the clean out shafts 129 pass through holes 121 and remove build up within the holes 121. Guide bars 131 guide the cleaner 117 as it passes below the bottom ends 133 of the heaters 113.

While the invention has been described with reference to specific embodiments, modifications and variations of the invention may be constructed without departing from the scope of the invention.

The invention is claimed is:

1. A contaminated gas treatment apparatus comprising:
   an inlet for contaminant gas,
   a heater compartment connected to the first inlet,
   one or more heaters surrounding the outer perimeter of the heater compartment for heating the contaminant gas,
   a movable cleaner mounted in the heater compartment, the cleaner having one or more cleaning surfaces adjacent to the one or more heaters, wherein the cleaner is movable back and forth along lengths and outer surfaces of the one or more heaters,
   openings through the cleaner parallel to the one or more heater walls allowing flow of gas through the cleaning plate,
   a receiver region below the one or more heaters receiving heated gas,
   a filter holder adjacent the receiver region,
   a filter in the filter holder removing solid particulates from the gas,
   an outer chamber adjacent the filter and surrounding the heater compartment flowing the gas through the chamber, and
   an exhaust connected to the outer chamber for removing gas from the chamber.

2. The apparatus of claim 1, further comprising a second heater projecting axially into the center of the heater compartment for heating the contaminant gas.

3. The apparatus of claim 1, wherein the cleaner is a cleaning plate continuously moving up and down the length of the one or more heaters approximately 30 to 60 times per minute.

4. The apparatus of claim 1, further comprising short rods mounted on a return position of the cleaning plate near the inlet keeping the cleaner openings clear of debris.

5. The apparatus of claim 4, wherein an operator moves the short rods across the openings in the cleaning plate.

6. The apparatus of claim 1, further comprising an oxygen injection inlet.

7. The apparatus of claim 6, further comprising an oxygen source heater chamber surrounding the heater chamber and connected to the receiver region and an oxygen source inlet connected to the oxygen source chamber supplying oxygen or air to the oxygen source heater chamber and to the receiver chamber for mixing heated oxygen or air with the heated contaminated gas.

8. The apparatus of claim 1, further comprising water sprays in the outer chamber for cooling and scrubbing gas in the outer chamber.

9. The apparatus of claim 1, further comprising a heat exchanger surrounding the outer chamber for cooling the gas in the outer chamber.

10. The apparatus of claim 9, wherein the heat exchanger is a series of tubes, a liquid jacket or an air cabinet surrounding the heater compartment.

11. The apparatus of claim 1, further comprising a chemical agent in the outer chamber removing contaminants in the gas in the outer chamber.

12. The apparatus of claim 11, further comprising a chemical agent tank connected to the exhaust outlet and a chemical agent in the tank removing contaminants from the gas.

13. A contaminated gas treatment apparatus comprising:
an inlet for contaminant gas,
a heater compartment connected to the inlet,
one or more heaters surrounding the heater compartment,
insulation surrounding the outer heater tube,
a movable cleaner mounted in the heater compartment and movable between and along lengths of the inner heater and the outer heater tube,
openings in the cleaner between an outer cleaning surface and an inner cleaning surface allowing flow of contaminant gas through the cleaner,
a plenum below the heater compartment,
a filter chamber connected to the plenum,
a filter in the filter chamber filtering solid particulates from the heated contaminant gas and decreasing temperature of the heated gas,
an outer chamber connected to the filter chamber, and
an exhaust outlet connected to the outer chamber for removing exhaust gas.

14. The apparatus of claim 13, further comprising a chemical agent in the outer chamber and removing contaminants from the gas with the chemical agent in the outer chamber.

15. The apparatus of claim 13, further comprising a chemical agent in a chemical agent tank connected to the exhaust outlet and removing contaminants from the gas with the chemical agent in the chemical agent tank.

16. The apparatus of claim 13, wherein the outer chamber comprises a removable tank having a top, a base and inner and outer walls, wherein the inner wall is spaced from the base, wherein the filter is positioned on the base between lower portions of the inner and outer walls, wherein particulate chemical agent is placed in the tank above the filter between the inner and outer walls, and wherein the gas is flowed through the outer chamber and through the filter.

17. The apparatus of claim 16, wherein the tank is removable from the inlet and the exhaust outlet for restoring the chemical agent and replacing the tank.

18. The apparatus of claim 13, further comprising an inner heater projecting axially into the center of the heater compartment for heating the contaminant gas.

* * * * *